United States Patent Office 3,072,779
Patented Jan. 8, 1963

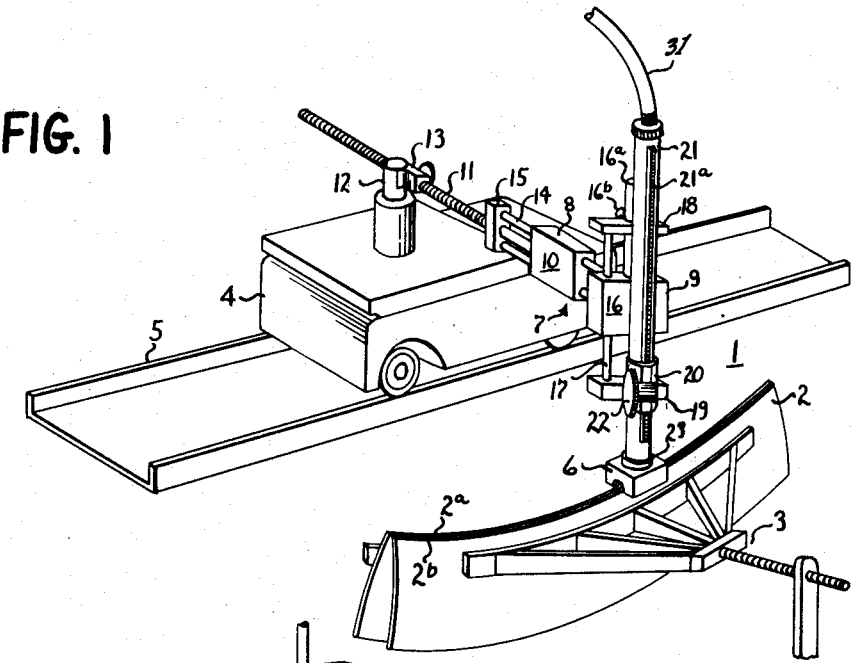
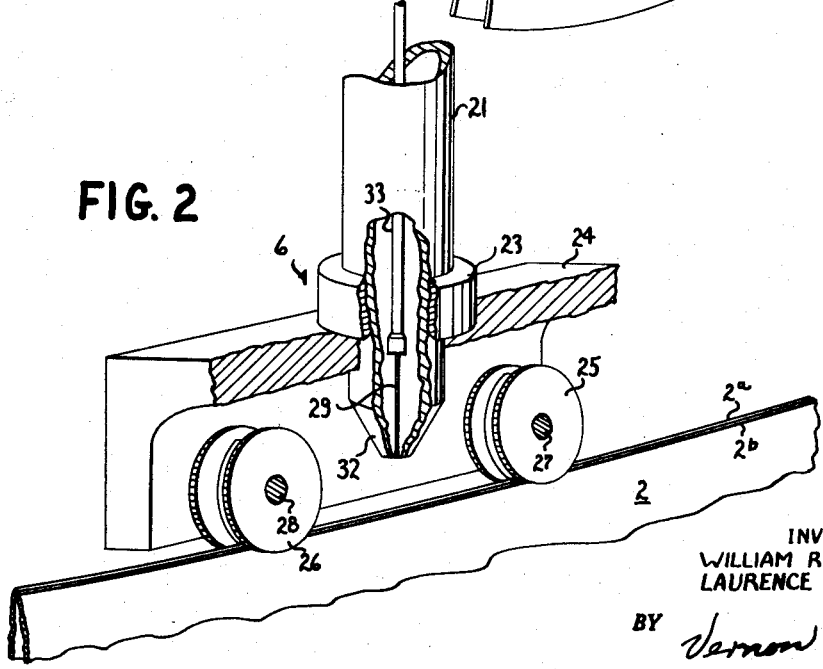

3,072,779
WELDING FOLLOWER DEVICE
William R. Masters and Laurence D. Glenn, Erie, Pa., assignors to General Electric Company, a corporation of New York
Filed Dec. 9, 1959, Ser. No. 858,415
4 Claims. (Cl. 219—125)

This invention relates to welding machines, and more particularly relates to a follower device for welding machines.

It is common practice to provide a welding machine wherein workpieces to be welded together are moved past a welding head carrying welding means such as an electrode or welding tip, depending upon whether the weld is to be made by arc or gas torch. In some instances, the workpieces are held stationary and a welding head is moved to accomplish a desired welding operation. In many such devices the welding head may be positioned a predetermined height above the work by a welding guide such as a rotating wheel or disk which bears on the work. The guide for a given piece of work is fixed relative to the welding means so that when the guide encounters a slightly raised or depressed portion in the work, the welding means follows this vertical movement of the guide means. Also the welding head may be arranged to rotate about the guide means in order that the welding means may follow a curved path. While these automatic welding machines have generally performed the task required of them when they are used, the seam to be welded must be very accurately aligned with the welding head with which it will have relative motion. Slight misalignment could cause the welding means to depart from the desired line of weld. To overcome this problem, complex and expensive arrangements have been devised to properly align a workpiece with a welding head and to compensate for temporary buckling of workpieces due to high localized heat areas. While such positioning and aligning arrangements have proved satisfactory in accomplishing the desired weld, they have proved unsatisfactory from a manufacturing viewpoint because of initial high cost and maintenance.

Additionally, automatic welding machines have been devised wherein the welding head follows a predetermined path to accomplish curved or otherwise non-linear welds; however, this type of welding machine requires either some sort of pattern to guide the welding means, or in more sophisticated welding machines, electronic detecting means and control and positioning circuitry is utilized to position and guide a welding means along a non-linear welding path. The major drawback of such machines is their high cost and maintenance requirements. Moreover, these machines are usually designed for a specific application and have little versatility.

In view of the limitations and complexities of these prior art welding machines, it is an object of this invention to provide a simple, economical automatic welding machine wherein misalignment of work with a welding head presents no problem.

It is another object of my invention to provide a welding machine wherein the welding means is guided by at least one of the pieces to be welded together.

It is a further object of my invention to provide a follower device adaptable for incorporation in existing welding machines wherein the welding means is guided along the desired line of weld by at least one of the workpieces.

It is a still further object of my invention to provide a new and improved welding follower device.

Briefly stated, these and other objects of my invention are achieved in one form thereof by providing a welding head which is floatably positioned with respect to a work station which is relatively movable with respect to a workpiece. The welding head carries a welding means and guide means positioned with respect to the welding means. The guiding means is so shaped or arranged as to be guidably engaged by the pieces to be welded throughout the length of the weld including possible transient lines of weld. The welding head is thus guided by the workpiece and is floatably positioned with respect to the work station. Movement of the welding means during a welding operation with respect to the work station is determined only by the workpieces.

The features of the invention which are believed to be novel are set forth with particularity in the appended claims. The invention itself, however, both as to its organization and method of operation, together with its further objects and advantages thereof, can best be understood by reference to the following drawings wherein:

FIGURE 1 illustrates a welding machine embodying our invention adapted for accomplishing a weld over a line of weld having three dimensions;

FIGURE 2 illustrates a cutaway view of the welding head utilized in the machine illustrated in FIGURE 1;

Figure 3:
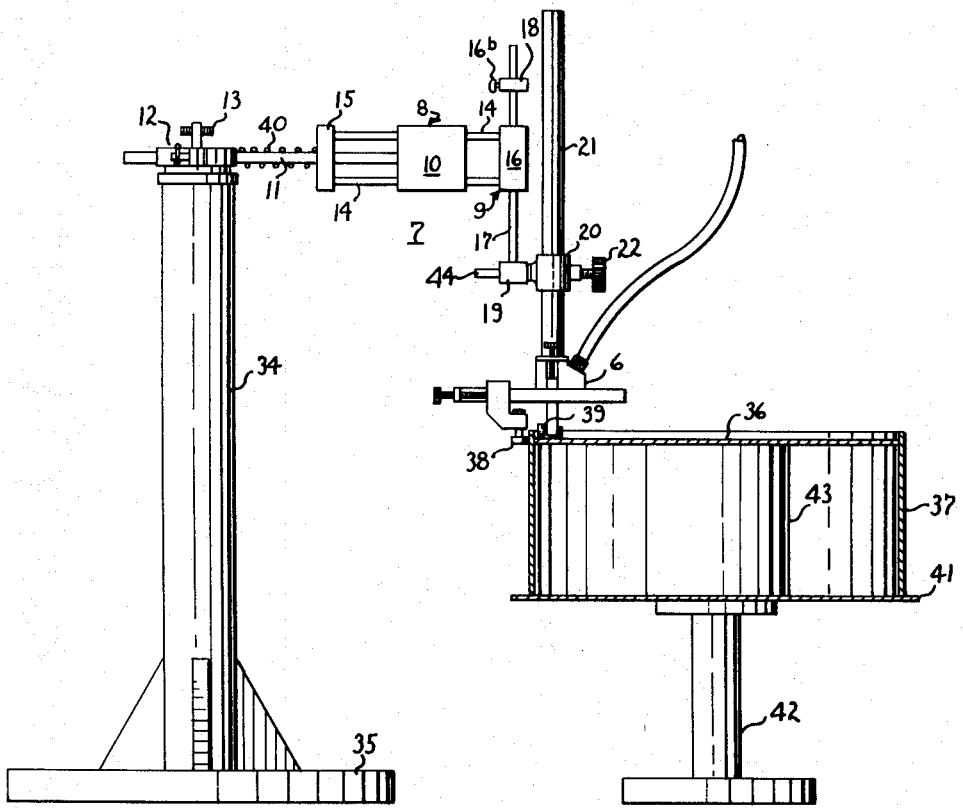
FIGURE 3 illustrates a welding machine embodying the invention adapted for accomplishing a weld of parts positioned transverse to one another.

Referring now to FIG. 1 which illustrates a welding machine generally indicated as 1 for accomplishing a line weld having two degrees of curvature, the workpiece 2 to be welded is an air foil fan blade fabricated from sheet stock. The workpiece 2 is held in a clamping fixture 3 which is positioned adjacent the work station. The workpiece, prior to being placed in the clamping fixture, has been folded upon itself and shaped to form an air foil fan blade and it is desired to weld together the edges 2a and 2b. The workpiece is positioned with respect to a work station comprising a platform such as a carriage 4 which is driven on track 5. Track 5 may be supported by any suitable support means, not shown. Supported from the carriage is a welding head 6 which moves relative to the seam formed by the edges 2a and 2b to be welded.

In accordance with our invention, we provide means on the welding head 6 to guidably engage the line of weld and mechanism 7 supporting the welding head with respect to the carriage 4 which allows the welding head 6 to float with the line of weld. By the term "float" we mean the allowance of freedom of movement, the movement being determined by the desired line of weld. The floating mechanism we prefer to use to allow the workpiece to guide the welding head comprises a horizontal slide arrangement 8 and a vertical slide arrangement 9. The horizontal slide arrangement 8 comprises a slide guide 10 affixed to toothed shaft 11, which in turn is adjustably secured to carriage 4 by means of a clamping fixture 12 having a ratchet-type locking adjustment 13. Parallel slide rods 14 extend through slide guide 10 and have one end secured in stopping member 15 which surrounds shaft 11. Sufficient clearance is provided in member 15 about shaft 11 to allow movement of the stopping member 15 with respect to shaft 11. The opposite ends of slide rods 14 are secured to vertical slide guide 16. The slide guide 16 is thus allowed to move laterally to and from a carriage 4 by means of slide rods 14 being movable in slide guide 10. Secured to slide guide 16 is shaft 16a. Slideable through slide guide 16 are two slide rods 17, only one of which is visible in FIG. 1. At the ends of the slide rods are stopping members 18 and 19 which limit the travel of slide rods 17 in slide guide 16. Stopping member 18 has an aperture therethrough of sufficient dimension to allow shaft 16a to pass through without engagement. A thumb screw 16b may be provided in member 18 to lock shaft 16a with respect to stopping member 18 and prevent slide guide 16 from moving vertically. Secured to stopping member 19 is a collar 20 holding a vertical adjustment member 21 having adjusting teeth 21a along its length. The member 21 may be adjusted vertically by means of a ratchet-type wheel engaging the teeth 21a or any other suitable means. A screw-type locking arrangement 22 to lock the ratchet wheel is provided. The vertical adjustment member carries a welding head 6 which is rotatable about the vertical adjustment member by means of collar 23.

Reference is now made to FIG. 2 which shows a cutaway view of the welding head 6 of FIG. 1. The welding head 6 comprises a housing 24 having guide means mounted therein. In this embodiment of our invention the guide means comprise rotatable work engaging means 25 and 26 which are in the form of wheels mounted on axles 27 and 28 in the housing member 24. The wheels 25 and 26 are formed with a hollow tread portion to straddle and be guidably engaged by the edges 2a and 2b to be welded togther. In this particular welding operation the edges 2a and 2b are fused together by metal inert gas welding utilizing a non-consumable tungsten electrode 29 and the area being welded is enclosed by an inert gas supplied through conduit 31 and member 21. The electrode 29 is positioned within housing 32 by a collet 33 which is connected to a source of electrode heating current, not shown.

The operation of the welding machine shown in FIGS. 1 and 2 will now be explained. When the edges 2a and 2b are to be joined by welding, the carriage 4 is initially positioned at the right end of tract 5 and the work guiding means 26 is made to engage the edges 2a and 2b. The carriage 4 is then driven, preferably by motor, on the track 5 in the direction indicated. An arc is struck between the tip of electrode 29 and edges 2a and 2b. As the welding head is carried along by the carriage 5, the electrode 29 is maintained a predetermined height above edges 2a and 2b by the work engaging guide wheels 25 and 26 and the edges 2a and 2b are welded or fused together. As the carriage progresses along the track 5, the guiding wheels 25 and 26 will follow the edges 2a and 2b and guide the electrode along the desired line of weld. By means of the floating mechanism the guiding wheels 25 and 26 are allowed to move vertically and horizontally with respect to the carriage 4, and also pivot about collar 23 as the welding head 6 progresses along the line of weld.

It may thus be seen that by provision of work engaging guiding means on the welding head, and by provision of the floating mechanism allowing the welding head to be guided by the work, no accurate positioning of the workpiece, with respect to a work station exemplified by the carriage 4 on track 5, is required.

Referring now to FIG. 3, I show my invention incorporated in a welding machine designed for fabricating the hub of a fan to which the workpiece 2 will eventually be attached. Like numerals of FIGS. 1 and 3 indicate like parts. In FIG. 3 the work station is stationary and the workpiece is moved relative to the work station. The welding machine of FIG. 3 comprises a stand 34 on a base 35 which provides a platform for the floating mechanism 7 and welding head 6. The welding machine of FIG. 3 is designed to make a circular weld joining circular plate member 36 to the inner periphery of cylindrical member 37, both members being shown in section. A welding head 6 is provided having welding means which may be similar to that shown in FIG. 2, but for clarity of illustration not shown in FIG. 3. The work engaging guiding means mounted on welding head 6 here comprise rollers 38 and 39 which engage the outer periphery of cylindrical member 37 and the upper surface of plate member 36 respectively. To properly position the welding means with respect to the desired line of weld, the welding head 6 is biased toward the workpieces by means of a helical spring 40 about shaft 11 which exerts a force on stopping member 15. This force is transmitted through the floating mechanism 7 to roller 38 bearing on the outer periphery of member 37. Roller 39 bearing on plate member 36 positions the welding means the proper height above the desired line of weld.

The member 37 may be supported on a plate 41 which rests on rotatable pedestal 42. A spacing member 43, which may be in the form of a cylinder, is provided to space member 36 a predetermined distance above plate 41. The pedestal 42 is rotated by any suitable means, preferably an electric motor drive, not shown. Placement of pedestal 42 with respect to the work station is not critical inasmuch as the welding head will float with respect to the platform upon which it is mounted. Furthermore, the pedestal need not be vertical but may be canted towards the welding head. If the pedestal should be so positioned the welding head may be rotatably positioned with respect to stopping block 19 by collar 20 being pivotably mounted therein on a shaft 44 pivotably mounted in stopping block 19. Although the workpiece 37 has been described as cylindrical, it is readily apparent that it could be elliptical or could be an irregular curve; the only limitation in this respect would be the length of travel of slide rods 14 in slide guide 10.

Figure 4:
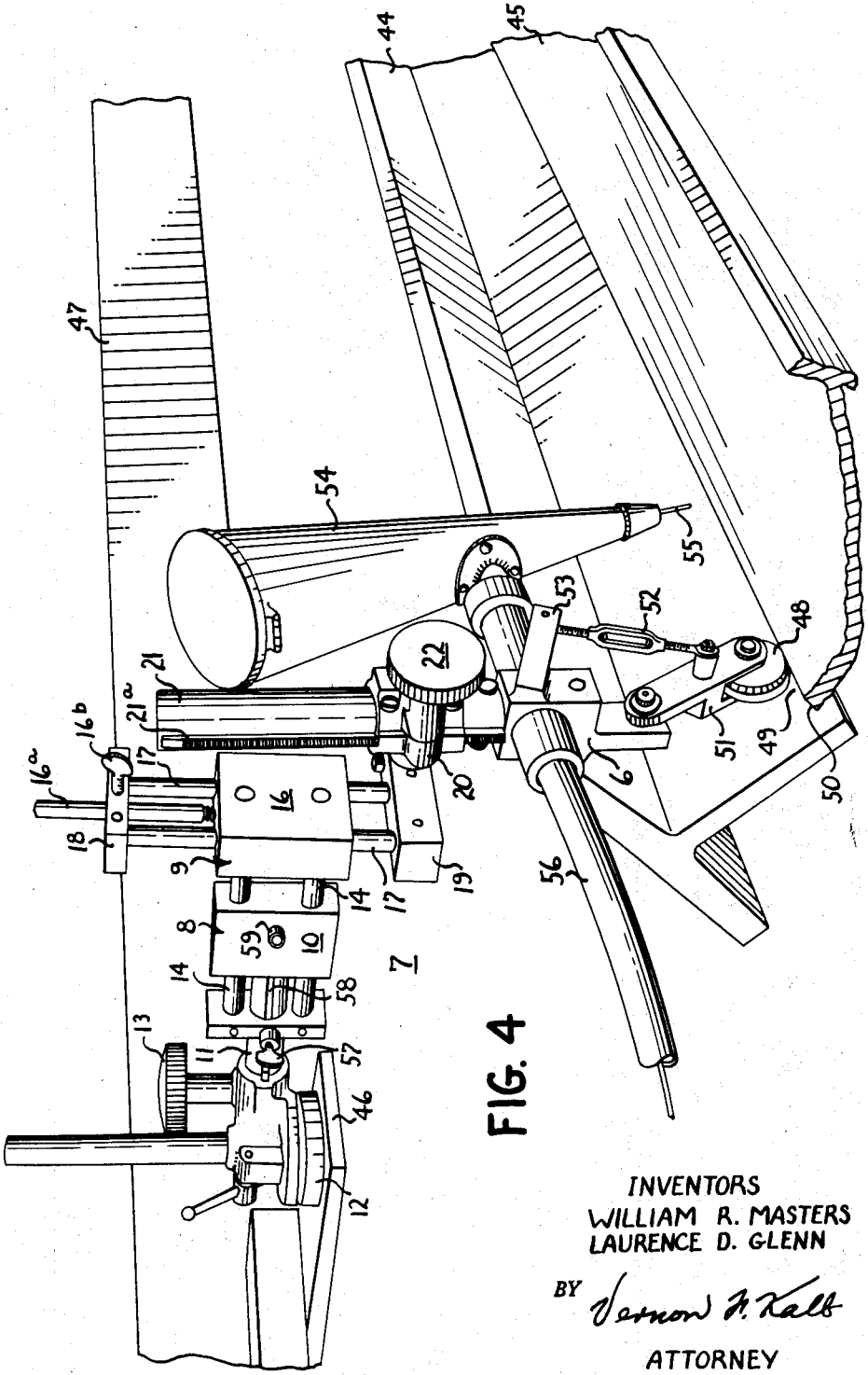
FIGURE 4 illustrates the invention incorporated in a machine designed for accomplishing a very long substantially linear weld.

Reference is now made to FIG. 4 wherein we show our invention embodied in a welding machine designed for accomplishing long, linear welds. Like numerals of FIGS. 1 and 4 indicate like parts. In this embodiment of our invention the workpieces are structural T sections 44 and 45 which are welded together to form an I beam which is used as the center sill of a locomotive. The joining of the members 44 and 45 is accomplished by a submerged arc weld. FIG. 4 also shows in more detail the floating mechanism which we prefer to use to position the welding head 6 with respect to a work station. The clamping fixture 12 is mounted on a movable work station comprising platform 46 which is movable along a guide rail 47. The platform 46 is preferably mounted on a movable housing carrying a motor driving a pinion which engages a rack on the guide rail. When the motor is operating, the pinion rotatably engages the teeth of the rack and drives the platform 46 along the guide rail 47. This drive mechanism is not illustrated inasmuch as it and equivalent linear drives are well-known to those skilled in the art.

In the embodiment of our invention shown in FIG. 4, the welding head 6 carries a work engaging guiding means in the form of a rotatable disk 48 having the edges of its periphery chamfered at a predetermined angle to guidably engage the projected line of weld formed by portions 49 and 50 of members 44 and 45 respectively. In the illustration the portions 49 and 50 present right angle surfaces along the projected line of weld, the members 44 and 45 being so positioned in a work holding jig that the surfaces which form the projected line of weld each form an angle of 45 degrees with the vertical. The chamfers on each edge of the work engaging guiding disk 48 are therefore made at 45 degrees. The guiding wheel 48 is positioned with respect to the welding electrode by means of a housing 51 pivotably mounted on the welding head 6 and vertically positioned by means of turnbuckle 52 mounted between the housing 51 and a projection 53 on the welding head 6. The welding head 6 also carries welding flux container 54 through which projects welding electrode 55. The welding electrode 55 is supplied through conduit 56 and flux container 54. By means of the turnbuckle 52 the tip of the welding electrode 29 may be positioned a predetermined distance above the surfaces to be welded. Adjustment of the turnbuckle may therefore be made to determine arc length. The rate of feed of electrode material as the electrode is consumed may be controlled in response to the welding arc voltage. A suitable apparatus for use in conjunction with this embodiment of our invention is a welding unit made by Air Reduction Company and marketed under the trade name Airomatic. This device supplies electrode material at a rate determined by the ratio of current to arc voltage plus supplying power to the electrode.

In actual practice, the embodiment of our invention shown in FIG. 4 is utilized to accomplish a weld on the order of 56 feet. Because the welding head is floatably mounted with respect to the work station or platform 46, it is not essential that the projected line of weld be accurately aligned with the guide rail 47. The work engaging guide disk 48 is engaged by the perpendicular surfaces 49 and 50 of members 44 and 45 respectively and follows any depressions or bulging along the projected line of weld. This is a very important feature inasmuch as the projected line of weld may deviate from the linear due to a localized heating effect produced by the electric arc, thus producing bulging or buckling of the surfaces 49 and 50. In some instances, it has been found that the perpendicular surfaces 49 and 50 between which the weld is accomplished will separate due to localized heating. This presents very little problem to a welding machine embodying our invention inasmuch as the work engaging disk 48 will position the welding electrode at the mean distance between the separated surfaces to be welded. No problem is presented by misalignment of the projected line of weld either laterally or vertically with the rail 45 inasmuch as the work engaging guiding disk 48 follows the projected line of weld and is free to move laterally on slide rods 14 with respect to the platform 46 and vertically on slide rods 17 with respect to platform 46.

When not in use the floating mechanism 7 may be locked in a predetermined position by means of thumb screw 16b bearing on shaft 16a and by means of set screw 57 which may be made to bear in groove 58 on shaft 11. Shaft 11 may be located in slide guide 10 by means of set screw 59 or may be threaded therein, as is the case of shaft 16a in slide guide 16. The ends of the slide rods may be secured in the stopping blocks by means of set screws.

In the embodiment of one invention shown in FIG. 4, the welding head is moved with the work engaging guiding disk leading. The work engaging guiding means used in my invention are of a material that is not adversely affected by the heat of welding. Although the carriage 4 of FIG. 1 has been described as moving in one direction during a welding operation, it is apparent that the carriage could be moved in either direction to perform a welding operation.

Figure 5:
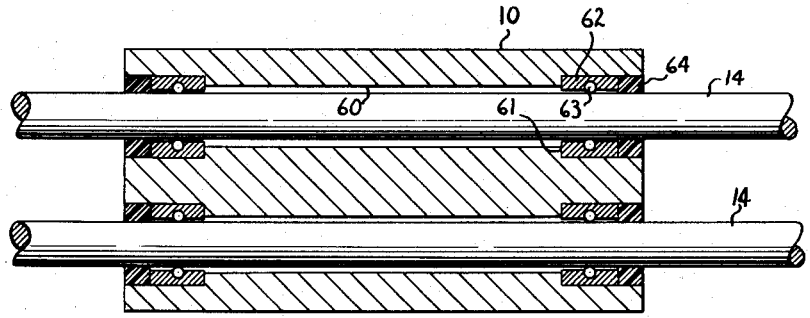
FIGURES 5 and 6 illustrate details of floating mechanisms which may be used in the invention.

It is important that there be no objectionable time delay in movement of the floating mechanism 7, therefore frictional resistance to movement must be minimized. In FIG. 5 we show in part details of construction of a slide guide and bar arrangement forming a portion of the mechanism for floatably positioning the welding means along a desired line of weld. FIG. 5 illustrates a vertical section taken through the horizontal slide arrangement 8. The slide guide 10 has cylindrical passages therethrough for receiving slide rods 14 therein. The passages 60 are enlarged at the ends a predetermined distance to form shoulders 61. Ball bushings 62 are seated in the enlarged portion of passages 60 against shoulders 61 and receive slide rods 14 therethrough. Clearance is provided between the surfaces of slide rods 14 and passages 60 so that the only friction presented to the movement of the slide rods 14 is the rolling friction of the balls 63 of ball bushings 62 on the surface of slide rods 14. Only one ring of balls 63 is illustrated in bushing 62 in FIG. 5; however, in actual practice the ball bushings contain a multiplicity of balls arranged in other than a single circular pattern. Such ball bushings are known to those skilled in the art. To prevent the ball bushing 62 from being contaminated by dust and other foreign matter, we provide an annular seal 64 at the openings to passage 60 to protect the bushings 62 from such contamination. The seal may be nylon or of any other suitable material. With this sliding arrangement comprising the floating mechanism 7, there is no adverse time delay in movement of the floating mechanism as the workpiece guidably engages the work engaging guiding means.

Figure 6:
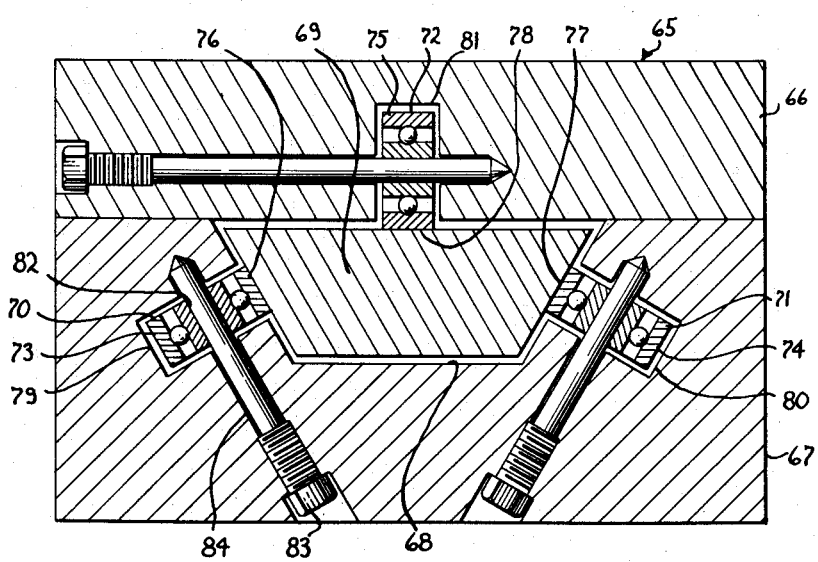

With the sliding arrangement illustrated in FIG. 5, it is necessary to have two rods 14 in the slide guide 10 to prevent possible rotation of a single slide rod. In FIG. 6, we show another slide arrangement which may be utilized in our invention. This arrangement uses only one slide rod. FIG. 6 illustrates a section through a slide guide showing a bearing arrangement at one end of a slide guide. The slide guide 65 comprises two sections 66 and 67, the section 67 having passage 68 therein through which a generally trapezoidal cross-section slide rod 69 may pass. The slide rod 69 is supported and positioned by roller bearing assemblies 70, 71 and 72 whose outer races 73, 74 and 75 engage surfaces 76, 77 and 78 respectively of slide rod 69. The bearing assemblies 70, 71 and 72 are positioned in cavities 79, 80 and 81 respectively provided in sections 66 and 67. Adequate clearance is provided between all bearing assemblies and the walls of their respective cavities. The inner races may be pressed on the shaft portion 82 of bolts 83 which is inserted in bores 84 in sections 66 and 67 at one end and positioned at the other end by threadably engaging sections 66 and 67. We prefer to curve the peripheral surface of the outer races to reduce the area of contact of the outer races with the surfaces 76, 77 and 78. With this arrangement, the rod 69 slides very easily in slide guide 65 with very little frictional drag.

The limits of motion of the welding head with respect to the platform upon which it is mounted will depend on the length of the slide rods and this length will be determined by the particular application of a welding machine incorporating our invention.

It is now apparent that we have provided a simple, inexpensive follower device for a welding machine wherein the workpiece determines the position of the welding means with respect to a welding station. While we have illustrated our preferred floating mechanisms, other structures will occur to those skilled in the art which will allow the same freedom of movement of the welding head as the sliding arrangements which we have illustrated. Other modifications of our disclosed embodiments will undoubtedly occur to those skilled in the art and our invention will be found adaptable for any type of welding operation wherein the desired line of weld moves relative to a welding means. Obviously the work engaging guiding means may vary in shape dependent on the relative shape of the work to be welded and the guiding means may be made to be adjustably positioned with respect to the welding means where the use of the machine requires such adjustment.

Our invention is also applicable to cutting operations. For example, if it is desired to cut a metal plate into strips, an arrangement could be used wherein work engaging means mounted on the welding head were guidably engaged by the edge of the sheet and spaced a predetermined distance from a cutting torch. In such an embodiment it would be necessary to provide biasing means such as the spring 38 about shaft 11 in FIG. 3 to urge the guiding means into engagement with an edge of the sheet to be cut.

While we have illustrated and described with particularity our invention in various embodiments which have been selected for purposes of illustration and disclosure, it will be obvious to one skilled in the art that various changes or modifications may be made in the disclosed examples without departing from the spirit and scope of the invention. Accordingly, it is our intention to

What we claim as new and desire to secure by Letters Patent of the United States is:

1. A welding follower device comprising, a platform member relatively movable with respect to a work supporting means, a welding head, a floating mechanism positioning said welding head with respect to said platform member, welding means carried by said support member, guide means on said support member positioned with respect to said welding means, said guiding means being shaped to be guidably engaged by the pieces to be welded whereby said welding means is guided by the workpieces upon relative motion of said platform and the workpieces, said floating mechanism comprising a first slide mechanism slideable horizontally in a first plane and carrying a second slide mechanism slideable vertically in a perpendicular plane, one of said slide mechanisms being mounted on said platform and said welding head being mounted on the other of said slide mechanisms whereby said welding means may move in transverse planes with respect to said platform along the desired line of weld upon relative movement of said platform member and said work supporting means.

2. A welding follower device comprising, a platform member relatively movable with respect to a work supporting means, a welding head, a floating mechanism positioning said welding head with respect to said platform member, welding means carried by said welding head, guide means on said welding head adjustably positionable with respect to said welding means, said guiding means being shaped to be guidably engaged by the pieces to be welded whereby said welding means is guided by the workpieces upon relative motion of the platform and the workpieces, said floating mechanism comprising a first slide guide arranged to be secured to the platform, first slide rod means mounted in said guide and slideable in a first plane, stopping means on the platform end of said first slide rod means to limit movement of said first slide rod means in said first slide guide, a second slide guide secured to the other end of said first slide rod, second slide rod means slideable through said second slide guide in a plane transverse to the first plane, stopping means on either end of said second slide rod means to limit movement of said second slide rod means through said second slide guide, the welding head being carried on one of said last-mentioned stopping means whereby said welding means may move in transverse planes with respect to said platform member as said guide means guides the welding means along the desired line of weld.

3. In welding apparatus comprising a platform member, a work-supporting means arranged to support workpieces to be welded, a welding means, a welding means support member, and means to cause relative movement between the platform member and the work-supporting means: a mechanism for interconnecting the platform member and the welding means support member comprising, first means allowing said support member to move horizontally in a direction transverse to the direction of relative motion between the platform member and the workpiece support means, second means connected to said first means allowing said welding support means to move vertically in a direction transverse to said direction of relative motion, one of said first and second means being carried by said platform member and the other of said first and second means having said support member secured thereto, guide means on said welding means support member positioned in predetermined relationship to said welding means and adapted to rest on and be guidably engaged by at least one of workpieces to be welded so that upon relative motion between said platform member and said work-supporting means said guide means follows a desired line of weld and said mechanism allows said welding means to move both vertically and horizontally transverse of the said direction of relative motion.

4. In welding apparatus comprising a platform member, a work-supporting means, a welding head, a welding head support member, and means to cause relative movement between the platform member and the work-supporting means: a mechanism interconnecting the platform member and the welding head support member and allowing said support member to move in transverse planes to follow a desired line of weld upon relative movement of said platform member and said supporting means, said mechanism comprising, first guide means arranged to be secured to said platform, first slide means carried by and slideable in said first guide means in a first plane, second guide means secured to said first slide means at one end thereof, second slide means slideable in said second guide means in a plane transverse to the first plane, said welding head support member being carried by said second slide means, guide means on said support member shaped to be guidably engaged by at least one of the pieces to be welded and to follow a desired line of weld upon relative movement of said platform an dsaid work-supporting means so that upon relative movement of said platform member and said work-supporting means said guide means guides said welding head along a desired line of weld and said mechanism allows said welding head to move in transverse directions with respect to the line of weld.

References Cited in the file of this patent

UNITED STATES PATENTS

| | | |
|---|---|---|
| 1,544,655 | Krebs | July 7, 1925 |
| 2,189,399 | Lewbers | Feb. 6, 1940 |
| 2,379,531 | Lippart | July 3, 1945 |
| 2,441,748 | Black | May 18, 1948 |
| 2,522,146 | Tichenor et al. | Sept. 12, 1950 |
| 2,618,727 | Osborne | Nov. 18, 1952 |
| 2,807,878 | Woods | Oct. 1, 1957 |
| 2,903,554 | Stepath | Sept. 8, 1959 |
| 2,989,617 | Stepath | June 20, 1961 |